June 10, 1930.   G. F. SCHAPER ET AL   1,762,798
SAW RIG
Filed Aug. 21, 1928   2 Sheets-Sheet 1

Inventor.
George F. Schaper.
John A. Schmitz.
by Hazard & Miller
Attorneys.

June 10, 1930.  G. F. SCHAPER ET AL  1,762,798
SAW RIG
Filed Aug. 21, 1928   2 Sheets-Sheet 2
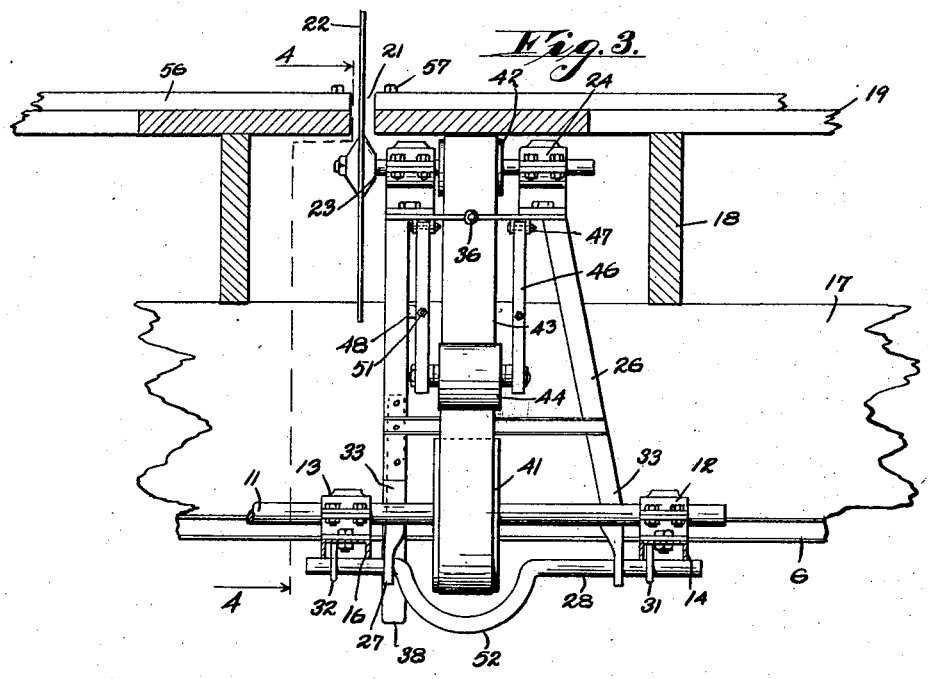
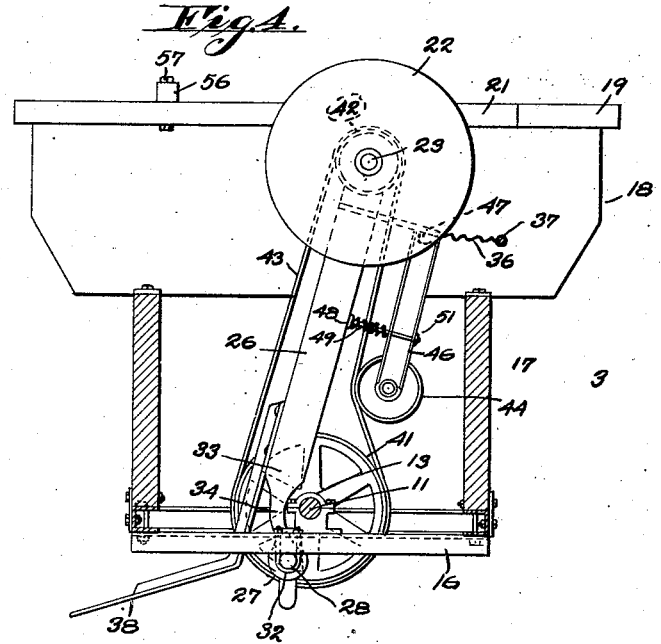
Inventor
George F. Schaper
John A. Schmitz
by Hazard Miller
Attorneys Patented June 10, 1930

1,762,798

UNITED STATES PATENT OFFICE

GEORGE F. SCHAPER AND JOHN A. SCHMITZ, OF BURBANK, CALIFORNIA

SAW RIG

Application filed August 21, 1928. Serial No. 301,148.

Our invention is a portable saw rig, and has for an object, the provision of a circular saw operatively mounted upon the chassis of an automobile.

A further object is the provision of a circular saw mounted as described, which is adapted to be powered by an internal combustion motor also mounted upon the chassis.

A further object is the provision of a saw table supported upon and elevated to a convenient height above the automobile frame and through a slot in which the circular saw extends.

A still further object is the provision of a saw rig of the general character described, wherein the saw mandrel is carried at the upper end of a yoke pivotally mounted to permit advancing the saw across the table in the operation of using the saw.

A still further object is the provision of a saw rig of the general character described, the table of which is provided with adjustable guides for positioning the work accurately at any desired angle in respect to the plane of the saw.

A still further object is the provision of an improved type of mounting for the yoke, whereupon the saw mandrel is journalled so that the original journalling of the propeller shaft of the vehicle may be preserved.

A still further object is the provision of an improved type of mounting for the yoke, whereby it may be pivoted below the drive shaft, permitting the use of a longer yoke than would be the case if the yoke were journalled for pivotal movement about an axis coincident with that of the drive shaft. As a result, the radial distance between the pivotal mounting of the yoke and the axis of the mandrel is increased, so that for a given distance of advance of the saw, less variation in the height of the saw above the table results.

The invention possesses other objects and advantageous features, some of which, with those enumerated, will be set forth in the following description of the invention's particular embodiment which is illustrated in the drawings accompanying and forming a part of the specification.

The form of construction herein disclosed, has in actual use, proven to be very efficient, capable of facile and rapid operation, and generally desirable in other respects. For these reasons, the details herein disclosed may be considered as preferred. It should be mentioned however, that while these details will hereinafter be specifically described, variations may be effected within the scope of the invention as claimed.

Referring to the drawings:

Fig. 3 is an enlarged detail view of a portion of the device.

Fig. 4 is a side elevation of the structure of Fig. 3, this view being a sectional view taken transversely of the frame, the planes of section being indicated by the lines 4—4 of Fig. 3, and the direction of view by the arrows.

Figure 1:
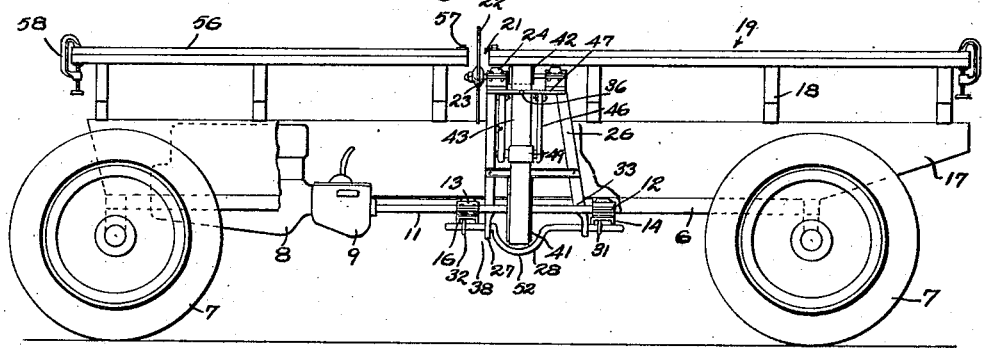
Figure 1 is a side elevation of the saw rig of our invention, portions of the framework being broken away to better reveal the nature of the invention.
Figure 2:
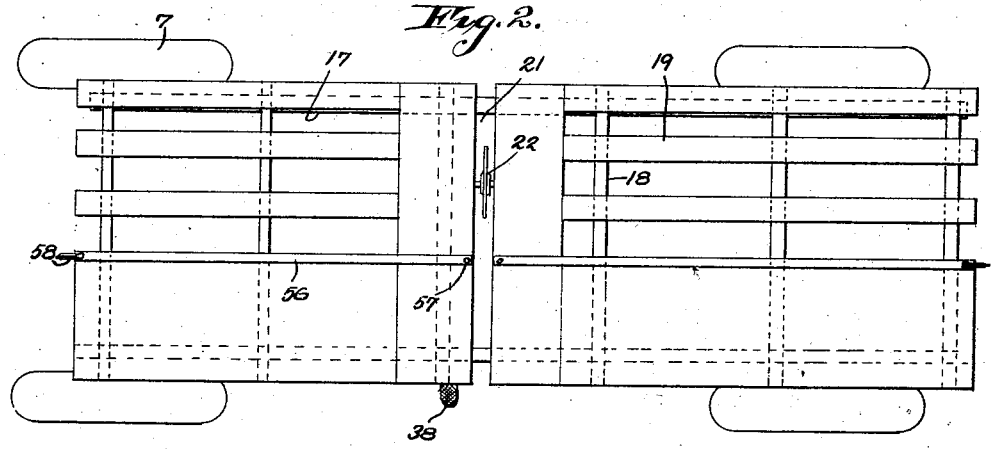
Fig. 2 is a top plan view.

The saw rig of our invention is adapted to be mounted upon the chassis of an automobile for ease of transportation. Any number of used automobile frames are accessible at a relatively low price, with the result that a suitable frame and means of transportation for the saw rig may be provided at relatively little expense.

Accordingly, the invention comprises an automobile frame 6 provided with supporting wheels 7 suitably journalled thereon, and with an internal combustion motor 8. This motor 8 may be the motor with which the vehicle was originally equipped, and/or it may be any other motor substituted therefor. In either event, convenient means for mounting the motor are afforded by the cross members upon which the vehicle motor was originally supported upon the frame 6. Preferably a change-speed transmission 9 is also provided for varying the speed of rotation of the drive shaft 11.

By utilizing the original mounting for the motor 8, the original journalling of the drive shaft 11 may be preserved, it being understood however, that the connection between this shaft and the rear wheels 7, is broken, as it is intended that in the transportation of the saw rig, it shall be towed by another vehicle. Additional journals 12 and 13 for the shaft 11, are rigidly connected to the frame 6 by means of cross members 14 and 16, respectively.

A pair of timbers 17 or steel beams are disposed longitudinally upon the frame 6, these timbers being braced by preferably a plurality of transversely disposed timbers 18 or steel beams for the rigid support of a saw table 19. A transversely disposed slot 21 is provided in the table 19, this slot being elongated to permit advance of the saw 22 which extends therethrough.

The saw 22 is carried by a mandrel 23 revolubly mounted adjacent the under side of the table 19 in journals 24 carried at the upper end of a yoke 26, this yoke being mounted for pivotal movement about an axis parallel to and below the shaft 11. To provide this mounting, aligned eyes 27 are secured at the lower end of the yoke, these eyes being revolubly mounted upon a rod 28 rigidly connected to the cross members 14 and 16 by brackets 31 and 32. The yoke 26 is disposed in front of the power shaft 11; and in order to permit swinging the yoke backwards, the arms 33 with which the eyes 27 are integrally formed, are provided with an offset 34, as clearly shown upon Fig. 4. A coil spring 36 is under tension between the yoke 26 and a bar 37 rigid with a pair of transverse timbers 18 at the back of the frame for the saw table 19, resulting in the normal retention of the saw 22 and yoke 26 in retracted position. A pedal 38 is rigidly connected to the yoke 26, this pedal extending to a point accessible from the front of the rig for advancing the saw 22 across the table through the slot 21 and against the action of the spring 36.

A drive pulley 41 is rigid with the shaft 11, and an aligned driven pulley 42 is provided upon the mandrel 23. A belt 43 engages both these pulleys, with the result that the saw 22 is rotated when the motor 8 is in operation. Since the axis of revolution of the yoke 26 and the axis of the shaft 11 are not coincident, variation in the distance between the axes of the mandrel 23 and the shaft 11, occurs as the yoke 26 is swung about its pivotal mounting. Accordingly, the belt 43 is of such length that it does not tightly engage the pulleys 41 and 42 without being engaged by an idler pulley 44 journalled at the lower end of preferably two arms 46 which are mounted for pivotal movement upon a bracket 47 rigid with the yoke 26. A bar 48 is also rigidly mounted upon the yoke 26, for the reception of a spring 49 which is under compression between one of the arms 46 and a nut 51 threaded upon the bar 48, to press the idler pulley 44 into engagement with the belt 43 to vary its effective length and retain it in driving engagement with the pulleys 41 and 42.

In order to accommodate the pulley 41 and belt 43, the rod 28 is deformed as at 52, leaving a space within which the pulley 41 and belt 43 may operate without interference.

In operating the saw rig of our invention, power is applied to the saw 22 by means of the motor 8, the transmission 9 being so adjusted as to impart the desired rotational speed to the saw 22. The idler pulley 44 will hold the belt 43 tight enough to drive the mandrel 23 and saw 22 from the power shaft 11, but will permit lengthening of the belt as the yoke 26 is swung forwards about its pivotal mounting. This forward swinging may be easily effected by stepping upon the pedal 38, resulting in swinging the saw across the table lengthwise of the slot 21, so that the saw 22 will cut any work lying upon the table 19 across the slot 21.

Proper positioning of the work may be assured by the use of guides 56 which are adjustably mounted upon the top of the table 19. A pivot pin 57 is rigid with the table 19 adjacent each side of the slot 21, and a guide 56, preferably an elongated strip of any suitable material, is pivoted upon each of these pins 57. Proper adjustment of the guides 56 may be gained by loosening the C clamps 58, one of which is provided for each guide 56, and which may be tightened to rigidly clamp the guide 56 to the table in selected adjustment.

We claim:

1. A portable saw rig comprising an automobile frame, supporting wheels journalled thereon, a motor carried by the frame, a power shaft operatively connected to the motor and journalled upon the frame to extend longitudinally thereof, a drive pulley rigid with said shaft, a yoke mounted upon said frame for pivotal movement about an axis lower than and slightly offset from said shaft, a saw table mounted upon said frame, a mandrel journalled upon said yoke adjacent the under side of the table, a saw carried by said mandrel and extending through a slot in said table, said slot being extended to permit swinging said yoke to advance the saw across the table, a driven pulley rigid with the mandrel, and a belt engaging both pulleys.

2. A portable saw rig comprising an automobile frame, supporting wheels journalled thereon, a motor carried by the frame, a power shaft operatively connected to the motor and journalled upon the frame to extend longitudinally thereof, a drive pulley rigid with said shaft, a yoke mounted upon said frame for pivotal movement about an axis lower than and slightly offset from said shaft, a saw table mounted upon said frame, a mandrel journalled upon said yoke adjacent the under side of the table, a saw carried by said mandrel and extending through a slot in said table, said slot being extended to permit swinging said yoke to advance the saw across the table, a driven pulley rigid with the mandrel, a belt engaging both pulleys, and means for varying the effective length of said belt.

3. A portable saw rig comprising an automobile frame, supporting wheels journalled thereon, a motor carried by the frame, a power shaft operatively connected to the motor and journalled upon the frame to extend longitudinally thereof, a drive pulley rigid with said shaft, a yoke mounted upon said frame for pivotal movement about an axis lower than and slightly offset from said shaft, a saw table mounted upon said frame, a mandrel journalled upon said yoke adjacent the under side of the table, a saw carried by said mandrel and extending through a slot in said table, said slot being extended to permit swinging said yoke to advance the saw across the table, a driven pulley rigid with the mandrel, a belt engaging both pulleys, an arm pivotally carried by said yoke, an idler pulley journalled on said arm, and resilient means interposed between said arm and yoke for pressing said idler pulley into engagement with the belt.

4. A portable saw rig comprising an automobile frame, supporting wheels journalled thereon, a motor carried by the frame, a power shaft operatively connected to the motor and journalled upon the frame to extend longitudinally thereof, a drive pulley rigid with said shaft, a yoke mounted upon said frame for pivotal movement about an axis lower than and slightly offset from said shaft, a saw table mounted upon said frame, a mandrel journalled upon said yoke adjacent the under side of the table, a saw carried by said mandrel and extending through a slot in said table, said slot being extended to permit swinging said yoke to advance the saw across the table, a driven pulley rigid with the mandrel, a belt engaging both pulleys, an arm pivotally carried by said yoke, an idler pulley journalled on said arm, resilient means interposed between said arm and yoke for pressing said idler pulley into engagement with the belt, means for advancing said yoke, and resilient means urging said yoke to withdrawn position.

5. A portable saw rig comprising an automobile frame, supporting wheels journalled thereon, a motor carried by the frame, a power shaft operatively connected to the motor and journalled upon the frame to extend longitudinally thereof, a drive pulley rigid with said shaft, a yoke mounted upon said frame for pivotal movement about an axis lower than and slightly offset from said shaft, a saw table mounted upon said frame, a mandrel journalled upon said yoke adjacent the under side of the table, a saw carried by said mandrel and extending through a slot in said table, said slot being extended to permit swinging said yoke to advance the saw across the table, a driven pulley rigid with the mandrel, a belt engaging both pulleys, an arm pivotally carried by said yoke, an idler pulley journalled on said arm, resilient means interposed between said arm and yoke for pressing said idler pulley into engagement with the belt, means normally retaining said yoke in retracted position, and a pedal carried by the yoke whereby the yoke may be swung to advance the saw across the table.

6. In a portable saw rig, an automobile chassis comprising a frame, supporting wheels journalled thereupon, a motor, and a power shaft coupled to said motor, a saw table mounted upon said chassis, a yoke mounted upon said frame for pivotal movement about an axis lower than the power shaft, a mandrel journalled upon the free end of said yoke, a saw carried by said mandrel and extending through a slot in said saw table, said slot being extended to permit swinging the saw across the table, a driven pulley rigid with said mandrel, a drive pulley in line therewith and rigid with said drive shaft, and a belt engaging both of said pulleys.

7. In a portable saw rig, an automobile chassis comprising a frame, supporting wheels journalled thereupon, a motor, and a power shaft coupled to said motor, a saw table mounted upon said chassis, a yoke mounted upon said frame for pivotal movement about an axis lower than the power shaft, a mandrel journalled upon the free end of said yoke, a saw carried by said mandrel and extending through a slot in said saw table, said slot being extended to permit swinging the saw across the table, a driven pulley rigid with said mandrel, a drive pulley in line therewith and rigid with said drive shaft, a belt engaging both of said pulleys, an arm pivotally carried by said yoke, an idler pulley journalled upon said arm, and resilient means interposed between said arm and yoke for pressing the idler pulley against the belt.

8. In a portable saw rig, an automobile chassis comprising a frame, supporting wheels journalled thereupon, a motor, and a power shaft coupled to said motor, a saw table mounted upon said chassis, a yoke mounted upon said frame for pivotal movement about an axis lower than the power shaft, a mandrel journalled upon the free end of said yoke, a saw carried by said mandrel and extending through a slot in said saw table, said slot being extended to permit swinging the saw across the table, a driven pulley rigid with said mandrel, a drive pulley in line therewith and rigid with said drive shaft, a belt engaging both of said pulleys, an arm pivotally carried by said yoke, an idler pulley journalled upon said arm, resilient means interposed between said arm and yoke for pressing the idler pulley against the belt, means urging said yoke into retracted position, and a pedal extending laterally from adjacent the lower end of said yoke whereby the yoke may be swung against the action of said urging means.

9. In a portable saw rig, an automobile chassis comprising a frame, supporting wheels journalled thereupon, a motor, and a power shaft coupled to said motor, a saw table mounted upon said chassis, said saw table extending entirely over said frame, a yoke mounted upon said frame for pivotal movement about an axis lower than the power shaft, a mandrel journalled upon the free end of said yoke, a saw carried by said mandrel and extending through a slot in said saw table, said slot being extended to permit swinging the saw across the table, a driven pulley rigid with said mandrel, a drive pulley in line therewith and rigid with said drive shaft, and a belt engaging both of said pulleys.

10. In a portable saw rig, an automobile chassis comprising a frame, supporting wheels journalled thereupon, a motor, and a power shaft coupled to said motor, a saw table mounted upon said chassis, said saw table being disposed at a greater elevation than any portion of its supporting structure, a yoke mounted upon said frame for pivotal movement about an axis lower than the power shaft, a mandrel journalled upon the free end of said yoke, a saw carried by said mandrel and extending through a slot in said saw table, said slot being extended to permit swinging the saw across the table, a driven pulley rigid with said mandrel, a drive pulley in line therewith and rigid with said drive shaft, and a belt engaging both of said pulleys.

In testimony whereof we have signed our names to this specification.

GEO. F. SCHAPER.
    JOHN A. SCHMITZ.